US010942254B2

(12) United States Patent
Ikeda

(10) Patent No.: US 10,942,254 B2
(45) Date of Patent: Mar. 9, 2021

(54) RADAR DEVICE AND ADJUSTING METHOD OF RADAR DEVICE

(71) Applicant: DENSO TEN Limited, Kobe (JP)

(72) Inventor: Daisuke Ikeda, Kobe (JP)

(73) Assignee: DENSO TEN Limited, Kobe (JP)

( * ) Notice: Subject to any disclaimer, the term of this patent is extended or adjusted under 35 U.S.C. 154(b) by 219 days.

(21) Appl. No.: 16/113,460

(22) Filed: Aug. 27, 2018

(65) Prior Publication Data

US 2019/0101619 A1 Apr. 4, 2019

(30) Foreign Application Priority Data

Sep. 29, 2017 (JP) .............................. JP2017-190270

(51) Int. Cl.
| | | |
|---|---|---|
| *G01S 7/40* | (2006.01) | |
| *G01S 13/34* | (2006.01) | |
| *G01S 13/58* | (2006.01) | |
| *G01S 7/35* | (2006.01) | |
| *G01S 13/931* | (2020.01) | |
| *G01S 13/00* | (2006.01) | |

(52) U.S. Cl.
CPC ................ *G01S 7/40* (2013.01); *G01S 7/352* (2013.01); *G01S 7/4008* (2013.01); *G01S 13/343* (2013.01); *G01S 13/584* (2013.01); *G01S 13/931* (2013.01)

(58) Field of Classification Search
CPC ........ G01S 7/40; G01S 13/343; G01S 7/4008; G01S 13/584; G01S 7/352; G01S 13/931; G01S 7/354; G01S 13/26; G01S 13/34
See application file for complete search history.

(56) References Cited

U.S. PATENT DOCUMENTS

| | | | | | |
|---|---|---|---|---|---|
| 5,134,411 | A | * | 7/1992 | Adler ..................... | G01S 13/931 342/130 |
| 5,325,097 | A | * | 6/1994 | Zhang et al. ......... | G01S 13/584 342/71 |
| 5,345,470 | A | * | 9/1994 | Alexander .............. | G01S 13/34 375/144 |
| 5,517,196 | A | * | 5/1996 | Pakett ................... | G01S 13/931 342/70 |
| 6,492,938 | B1 | * | 12/2002 | Alland .................... | G01S 7/354 342/129 |
| 6,507,311 | B2 | * | 1/2003 | Sauer .................... | G01S 13/931 180/169 |
| 8,390,506 | B2 | * | 3/2013 | Focke ................... | G01S 13/931 342/70 |

(Continued)

FOREIGN PATENT DOCUMENTS

JP 2017-090143 A 5/2017

*Primary Examiner* — Bernarr E Gregory
(74) *Attorney, Agent, or Firm* — Oliff PLC

(57) ABSTRACT

There is provided a radar device. A transmitting unit transmits a transmitted wave of a modulation wave whose frequency changes cyclically. A receiving unit receives a reflected wave which is the transmitted wave reflected by a target. A detection unit detects the target based on the reflected wave received by the receiving unit. An adjusting unit adjusts a modulation waveform of the transmitted wave transmitted from the transmitting unit such that the target provided at a known position as an object is detected by the detection unit at the known position and the target is not detected at positions other than the known position by the detection unit.

8 Claims, 9 Drawing Sheets

(56) References Cited

U.S. PATENT DOCUMENTS

| | | | |
|---|---|---|---|
| 9,140,780 B2* | 9/2015 | Heilmann | G01S 13/343 |
| 9,329,073 B2* | 5/2016 | Sai | G01S 13/26 |
| 9,395,435 B2* | 7/2016 | Kuo | G01S 13/931 |
| 9,448,301 B2* | 9/2016 | Abbasi | G01S 7/354 |
| 9,921,295 B2* | 3/2018 | Altus | G01S 7/35 |
| 10,408,920 B2* | 9/2019 | Kurono | G01S 13/343 |
| 10,545,227 B2* | 1/2020 | Kuehnle | G01S 13/931 |
| 2008/0122680 A1* | 5/2008 | Morinaga | G01S 13/584 |
| | | | 342/109 |
| 2011/0122014 A1* | 5/2011 | Szajnowski | G01S 13/931 |
| | | | 342/109 |

\* cited by examiner

RADAR DEVICE AND ADJUSTING METHOD OF RADAR DEVICE

CROSS-REFERENCE TO RELATED APPLICATIONS

This application is based on and claims priority under 35 USC 119 from Japanese Patent Application No. 2017-190270 filed on Sep. 29, 2017.

BACKGROUND

Technical Field

The disclosed embodiment relates to a radar device and an adjusting method of the radar device.

Conventionally, there has been known a radar device which transmits a transmitted wave of a modulation wave whose frequency cyclically changes, receives a reflected wave which is a transmitted wave reflected by a target, and detects the target based on the reflected wave (see, for example, Patent Document 1).

The radar device generates a beat signal by mixing the transmitted wave and the reflected wave, calculates a direction of the target, a distance to the target, and a relative velocity to the target based on information obtained by sampling the beat signal at a timing synchronized with a modulation cycle of the transmitted wave to detect the target.

Patent Document

Patent Document 1: JP-A-2017-90143

SUMMARY

However, in the radar device, a deviation may be generated between the modulation cycle of the transmitted wave and a sampling cycle of the beat signal, and detection accuracy of the target decreases in this case.

It is therefore an object of the disclosure to provide a radar device and an adjusting method of the radar device which prevents a decrease in detection accuracy of a target.

According to an aspect of the embodiments of the present disclosure, there is provided a radar device including: a transmitting unit which transmits a transmitted wave of a modulation wave whose frequency changes cyclically; a receiving unit which receives a reflected wave which is the transmitted wave reflected by a target; a detection unit which detects the target based on the reflected wave received by the receiving unit; and an adjusting unit which adjusts a modulation waveform of the transmitted wave transmitted from the transmitting unit such that the target provided at a known position as an object is detected by the detection unit at the known position and the target is not detected at positions other than the known position by the detection unit.

The radar device and the adjusting method of the radar device according to an aspect of the embodiment can prevent a decrease in the detection accuracy of the target.

BRIEF DESCRIPTION OF DRAWINGS

Exemplary embodiments of the present invention will be described in detail based on the following figures, wherein.

DETAILED DESCRIPTION

Hereinafter, a radar device and an adjusting method of the radar device disclosed in the present application will be described in detail with reference to the accompanying drawings. It should be noted that the invention is not limited to the following embodiments.

Figure 1:
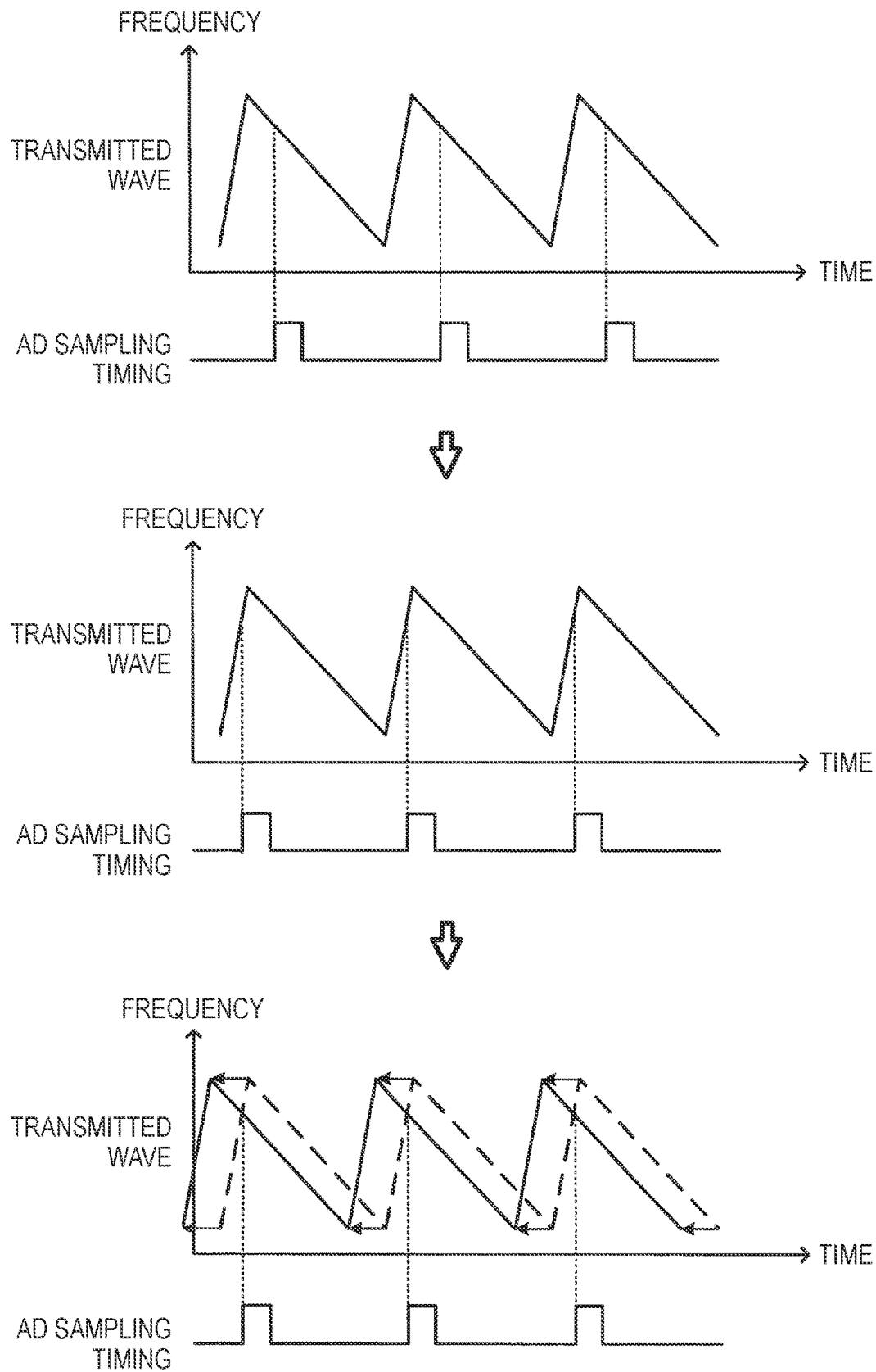
FIG. 1 is an illustrative diagram of an adjusting method of a radar device according to an embodiment.

FIG. 1 is an illustrative diagram of an adjusting method of the radar device according to an embodiment. An upper section, a middle section, and a lower section of FIG. 1 show a transmitted wave of a modulation wave transmitted by the radar device and a timing when the radar device analog-digital samples (hereinafter referred to as "AD sample") a beat signal, respectively.

As shown in the upper section of FIG. 1, the radar device makes one waveform of the transmitted wave, which is a modulation wave modulated such that the frequency cyclically changes in a sawtooth waveform, to be one chirp and transmits a plurality of continuous chirps to a detection area of a target. Further, the radar device receives the reflected wave which is the transmitted wave reflected by the target, mixes the transmitted wave and the reflected wave and takes a difference between the transmitted wave and the reflected wave, thereby generating a beat signal.

Further, the radar device AD samples the generated beat signal at a timing of a predetermined cycle, thereby converting the analog beat signal into a digital signal. The radar device detects the target by calculating a distance to the target and a relative velocity to the target based on the frequency and a phase of the beat signal converted into the digital signal in this way.

At this time, the radar device AD samples the beat signal at a timing synchronized with a modulation cycle of the transmitted wave, thereby detecting the target with high accuracy. For example, as shown in the upper section of FIG. 1, the radar device AD samples the beat signal at a timing synchronized with a predetermined timing at which a frequency in each chirp of the transmitted wave decreases.

Here, when an operation clock of a transmitting unit which transmits the transmitted wave slightly deviates from an operation clock of the receiving unit which AD samples the beat signal, the radar device gradually increases the deviation between the modulation cycle of the transmitted wave and the AD sampling cycle of the beat signal.

For example, as shown in the middle section of FIG. 1, when the beat signal is AD sampled during a period in which the frequency of each chirp of the transmitted wave increases, the radar device may not be able to detect the target, and the detection accuracy of the target decreases.

Therefore, in the adjusting method of the radar device according to the embodiment, for example, a target serving as an object is provided in a known position in the detection area of the radar device, and the radar device detects the target. At this time, when one target is provided, the radar device detects the target at the known position as long as the radar device AD samples the beat signal at the AD sampling timing shown in the upper section of FIG. 1.

However, for example, when the beat signal is AD sampled at the AD sampling timing shown in the middle section of FIG. 1, the radar device may not detect the target at the known position or may detect the target at a plurality of positions such as the known position or positions other than the known position.

For this reason, for example, when one target is provided at the known position, the radar device adjusts the modulation waveform of the transmitted wave such that one target is detected at the known position and the target is not detected at positions other than the known position.

For example, as shown in the lower section of FIG. 1, the radar device adjusts the modulation waveform of the transmitted wave by performing adjustment for shifting a phase of the transmitted wave. Accordingly, since the radar device can AD sample the beat signal at the timing synchronized with the predetermined timing at which the frequency of each chirp of the transmitted wave decreases, it is possible to prevent a decrease in the detection accuracy of the target.

Accordingly, although a case where the radar device adjusts the modulation waveform of the transmitted wave by shifting the phase of the transmitted wave has been described here, the radar device can adjust the modulation waveform of the transmitted wave by adjusting the frequency of the transmitted wave.

Accordingly, since the radar device can AD sample the beat signal at the timing synchronized with the predetermined timing at which the frequency of each chirp of the transmitted wave decreases, it is possible to prevent a decrease in the detection accuracy of the target.

Further, although a case where the target is provided at the known position and the modulation waveform of the transmitted wave is adjusted by detecting the target by the radar device has been described here, the radar device can also adjust the modulation waveform of the transmitted wave without providing a product of the target. An example of the adjusting method of the radar device will be described later.

Figure 2:
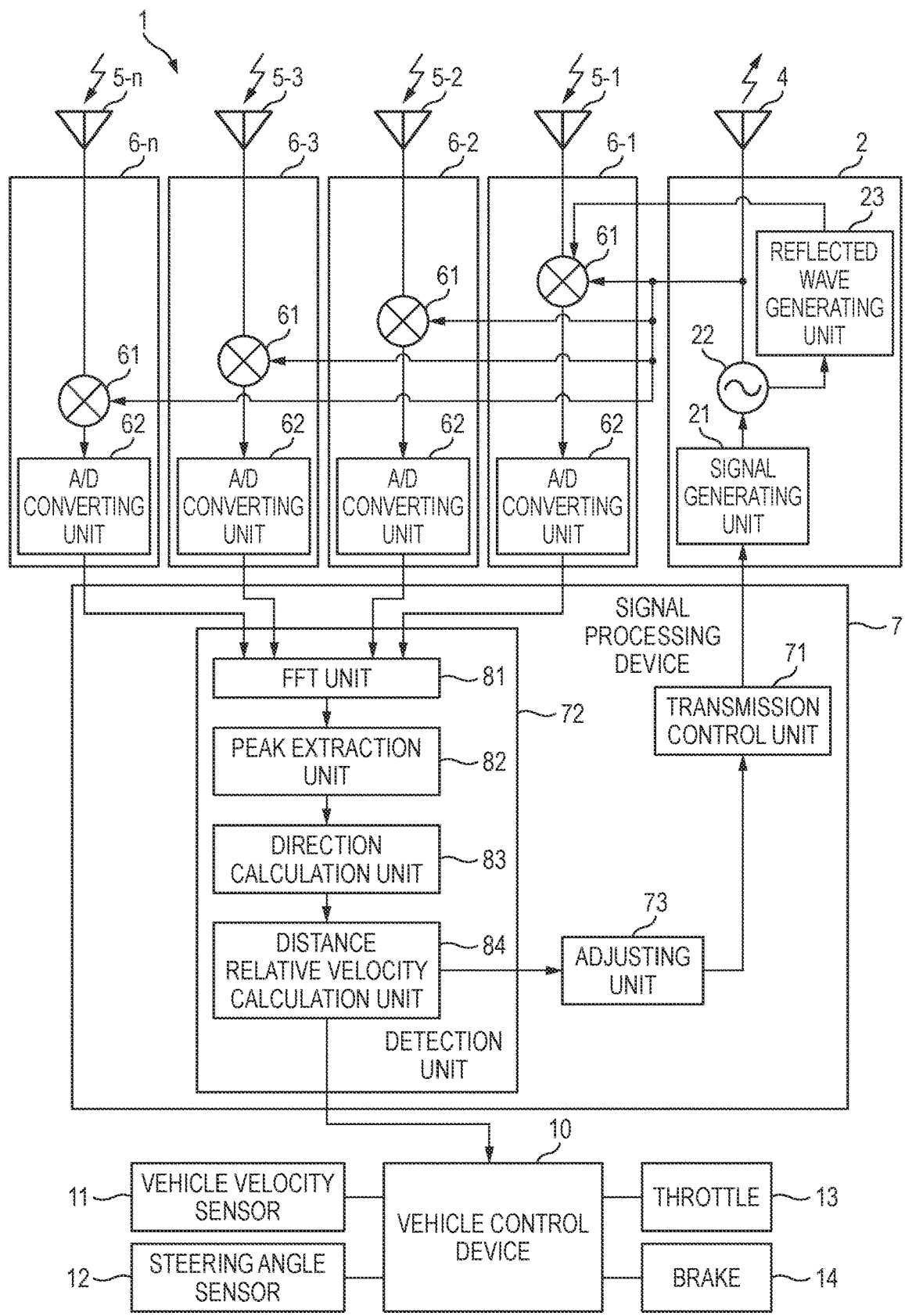
FIG. 2 is a block diagram showing an example of a configuration of the radar device according to the embodiment.

Next, an example of the configuration of the radar device according to the embodiment will be described with reference to FIG. 2. FIG. 2 is a block diagram showing an example of a configuration of the radar device 1 according to the embodiment. In FIG. 2, only components necessary for describing features of the present embodiment are represented by functional blocks, and a description of general components is omitted.

In other words, each component illustrated in FIG. 2 is functionally conceptual and does not necessarily need to be physically configured as illustrated. For example, a specific form of distributing and integrating functional blocks is not limited to that illustrated in the drawings, and all or a part thereof may be configured to be functionally or physically distributed and integrated in arbitrary units according to various loads and usage status.

The radar device 1 is mounted on a vehicle (hereinafter referred to as a "host vehicle") and detects a target around the host vehicle. The radar device 1 may also be mounted on an airplane or a ship to detect surrounding targets.

Hereinafter, a case where the radar device 1 is a device which detects a target by a Fast Chip Modulation (FCM) method will be described. The method of detecting the target by the radar device 1 is not limited to the FCM method and may be an FM-CW method.

As shown in FIG. 2, the radar device 1 includes a transmitting unit 2 and a transmitting antenna 4 as components configuring a transmission system. The transmitting unit 2 includes a signal generating unit 21, an oscillator 22, and a reflected wave generating unit 23.

Further, the radar device 1 includes receiving antennas 5-1 to 5-*n* and receiving units 6-1 to 6-*n* as components configuring a reception system. Each of the receiving units 6-1 to 6-*n* includes a mixer 61 and an A/D converting unit 62. Further, the radar device 1 includes a signal processing device 7 as a component configuring a signal processing system.

In the following description, the receiving antennas 5-1 to 5-*n* are collectively referred to as a "receiving antenna 5" in order to simplify the description. The same is applied to a "receiving unit 6".

The transmitting unit 2 performs processing of generating the transmitted wave. The signal generating unit 21 generates a modulation signal for generating a transmitted wave whose frequency changes cyclically in a sawtooth waveform under the control of a transmission control unit 71 included in the signal processing device 7 which will be described later and outputs the modulation signal to the oscillator 22.

The oscillator 22 generates a transmitted wave (a plurality of continuous chirps) of the modulation wave whose frequency changes periodically based on the modulation signal generated by the signal generating unit 21 and outputs the transmitted wave to the transmitting antenna 4.

The transmitting antenna 4 transmits the transmitted wave generated by the oscillator 22, for example, to a front side of the host vehicle. As shown in FIG. 2, the transmitted wave generated by the oscillator 22 is also distributed to the mixer 61 which will be described later.

Further, the oscillator 22 outputs the transmitted wave to the reflected wave generating unit 23 during, for example, an initial processing at the time of activation or during a fault diagnosis operation for performing fault diagnosis of the radar device 1. The initial processing is processing performed first after the radar device 1 is activated and is processing of initializing the setting of hardware included in the radar device 1 when power is turned on. The function and operation of the reflected wave generating unit 23 will be described later.

The transmitted wave transmitted from the transmitting antenna 4 is reflected by the target, so that the receiving antenna 5 receives the reflected wave coming from the target. Each receiving unit 6 performs preprocessing until each received reflected wave is passed to the signal processing device 7.

Specifically, each mixer 61 mixes the transmitted wave distributed as described above and the reflected wave received by each receiving antenna 5 and takes an absolute value of a difference between the transmitted wave and the reflected wave, thereby generating the beat signal. A corresponding amplifier may be disposed between the receiving antenna 5 and the mixer 61.

The A/D converting unit 62 digital converts the beat signal generated by the mixer 61 and outputs the digital signal to the signal processing device 7. The A/D converting unit 62 AD samples the beat signal generated by the mixer 61 at the timing of the predetermined cycle, thereby converting the analog beat signal into the digital signal.

For example, as described above, the A/D converting unit 62 AD samples the beat signal at the predetermined timing at which the frequency in each chirp of the transmitted wave decreases. Here, as shown in FIG. 2, there is a physical distance between the receiving unit 6 and the transmitting unit 2, and the receiving unit 6 and the transmitting unit 2 are provided on different substrates.

For this reason, for example, when electrical wiring for a reference clock is routed on the substrate and the operation clock of the transmitting unit 2 is supplied to the A/D converting unit 62 of the receiving unit 6 via the wiring, accuracy degradation as the reference clock and noise may occur due to transmission delay or the like in the wiring.

Therefore, the transmitting unit 2 and the receiving unit 6 are configured to operate using individual operation clocks. However, it is not easy to completely match the operation clock of the transmitting unit 2 and that of the receiving unit 6, and a very small deviation may be generated.

When there is a deviation between the operation clock of the transmitting unit 2 and that of the receiving unit 6, the radar device 1 cannot AD sample the beat signal at the timing when the frequency of each chirp decreases.

For example, when the beat signal is AD sampled during the period in which the frequency of each chirp of the transmitted wave increases, the radar device may not be able to detect the target, and the detection accuracy of the target decreases.

The radar device 1 can adopt, for example, a component with higher accuracy in order to suppress the deviation between the operation clock of the transmitting unit 2 and that of the receiving unit 6 within a predetermined range, but this will increase the cost.

Further, the radar device 1 can also provide a Wait time by, for example, extending the time in which the frequency of the transmitted wave is lowered, in order to allow the deviation between the operation clock of the transmitting unit 2 and that of the receiving unit 6.

However, when the radar device 1 has a configuration in which the Wait time is provided, the time during which the transmitted wave is transmitted becomes long, and since there is a concern that the transmitted unit 2 generates heat, a countermeasure cost of heat generation is required, and the cost is increased.

Therefore, the radar device 1 includes an adjusting unit 73 in the signal processing device 7 in a subsequent stage and adjusts the modulation waveform of the transmitted wave by the adjusting unit 73 such that the A/D converting unit 62 can AD sample the beat signal at the predetermined timing at which the frequency in each chirp of the transmitted wave decreases.

Accordingly, the adjusting unit 73 can prevent a decrease in the detection accuracy of the target while suppressing the increase in the cost of the radar device 1. An adjusting method of the modulation waveform by the adjusting unit 73 will be described later.

The signal processing device 7 includes a transmission control unit 71, a detection unit 72, and an adjusting unit 73. The transmission control unit 71 controls the operation of the signal generating unit 2 so as to generate and output the transmitted wave. The detection unit 72 detects the target by calculating a direction of the target, the distance to the target, and the relative velocity to the target by the FCM method.

Here, a calculation method for calculating the distance to the target and the relative velocity to the target by the FCM method by the detection unit 72 will be briefly described. The detection unit 72 calculates the distance to the target and the relative velocity to the target based on the beat signal converted into the digital signal input from each A/D converting unit 62.

At this time, the beat signal is input to the detection unit 72 for each cycle (each chirp) of the transmitted wave. In this case, since the time (delay time) from the transmission of the transmitted wave by the transmitting unit 2 to the reception of the reflected wave which is the transmitted wave reflected by the target by the receiving unit 1 increases or decreases in proportion to the distance between the target and the radar device 1, the frequency of the beat signal is proportional to the distance to the target.

Therefore, when the detection unit 72 performs Fast Fourier Transform (FFT) processing on the beat signal, a peak appears at a position of the frequency corresponding to the distance to the target in a processing result of the FFT processing.

At this time, in the FFT processing, since a reception level and phase information are extracted for each frequency point (hereinafter, referred to as a "distance BIN") set at a predetermined frequency interval, a peak appears at the distance BIN of the frequency corresponding to the distance to the target accurately. Therefore, the detection unit 72 can obtain the distance to the target by detecting a peak frequency.

In the FCM method, when a relative velocity is generated between the host vehicle and the target, a phase change corresponding to a Doppler frequency appears between the beat signals sequentially input to the detection unit 72. Therefore, the detection unit 72 detects the Doppler frequency between the beat signals and calculates the relative velocity.

For example, when the relative velocity between the radar device 1 and the target is 0, since no Doppler component is generated in the reflected wave, the phase of the reflected wave corresponding to each chirp is the same. On the other hand, when there is a relative velocity between the radar device 1 and the target, the Doppler phase change is generated between the reflected waves corresponding to each chirp. The peak information obtained by performing the FFT processing on the beat signal includes the phase information.

Therefore, the detection unit 72 can calculate the Doppler frequency from the phase information by performing second FFT processing on the peak information of the same target obtained from each beat signal in time series. Then, in the processing result of the second FFT processing, a peak appears at a frequency position.

At this time, in the second FFT processing, since the phase information is extracted for each frequency point (hereinafter, referred to as a "velocity BIN") set at the predetermined frequency interval according to velocity resolution, a peak appears at the velocity BIN of the frequency corresponding to the relative velocity to the target. Therefore, the detection unit 72 can obtain the relative velocity to the target by detecting the peak frequency.

The detection unit 72 includes, for example, a microcomputer which includes a Central Processing Unit (CPU), a Read Only Memory (ROM), a Random Access Memory (RAM) and an input/output port, and various circuits.

The detection unit 72 includes a plurality of processing units which function by the CPU executing a target detection program stored in the ROM using the RAM as a work area. Specifically, the detection unit 72 includes an FFT unit 81, a peak extraction unit 82, a direction calculation unit 83, and a distance relative velocity calculation unit 84.

Some or all of the processing units included in the detection unit 72 may be configured by hardware such as an Application Specific Integrated Circuit (ASIC) or an Field Programmable Gate Array (FPGA).

The FFT unit 81 performs first FFT processing on the beat signal sequentially input from the A/D converting unit 62 of each receiving unit 6 and obtains a processing result for each distance BIN set at the predetermined frequency interval.

Further, the FFT unit 81 performs the second FFT processing on the result of the first FFT processing for each of the same distance BIN of a plurality of beat signals and obtains a processing result for each velocity BIN set at the predetermined frequency interval.

Then, the FFT unit 81 outputs the processing result of the first FFT processing and the processing result of the second FFT processing to the peak extraction unit 82. The peak extraction unit 82 extracts peaks from the processing result of the first FFT processing and the processing result of the second FFT processing and outputs the peaks to the direction calculation unit 83.

The direction calculating unit 83 derives the direction of the target with respect to the radar device 1 based on the phase difference of the reflected waves received by the plurality of receiving antennas 5 and outputs the derived direction of the target and the peak extracted by the peak extracting unit 82 to the distance relative velocity calculation unit 84.

The distance relative velocity calculation unit 84 detects the frequency of the peak extracted from the processing result of the first FFT process input from the peak extraction unit 82 via the direction calculation unit 83 and derives the distance corresponding to the distance BIN where the frequency of the peak is detected as the distance to the target.

In addition, the distance relative velocity calculation unit 84 detects the frequency of the peak extracted from the processing result of the second FFT processing input from the peak extraction unit 82 via the direction calculation unit 83 and derives the velocity corresponding to the velocity BIN where the frequency of the peak is detected as the relative velocity to the target.

Then, the distance relative velocity calculation unit 84 outputs the target information including the derived distance to the target, the relative velocity to the target, and the direction of the target derived by the direction calculation unit 83 to an external device. The distance relative velocity calculation unit 84 outputs a derived result of the distance to the target and the relative velocity to the target to the adjusting unit 73.

Here, the external device is, for example, a vehicle control device 10. The vehicle control device 10 is an Electronic Control Unit (ECU) which controls each device of the host vehicle. The vehicle control device 10 is electrically connected to, for example, a vehicle velocity sensor 11, a steering angle sensor 12, a throttle 13, and a brake 14.

The vehicle control device 10 performs vehicle control such as Adaptive Cruise Control (ACC) or a Pre-Crash Safety System (PCS) based on the target information acquired from the radar device 1.

For example, when ACC is performed, the vehicle control device 10 uses the target information acquired from the radar device 1 and controls the throttle 13 and the brake 14 such that the host vehicle follows a preceding vehicle while maintaining an inter-vehicle distance to the preceding vehicle at a constant distance. In addition, the vehicle control device 10 acquires traveling states of the host vehicle, that is, the vehicle velocity, the steering angle, or the like, which change at any time, from the vehicle velocity sensor 11, the steering angle sensor 12, or the like, and feeds the travelling states back to the radar device 1 every time.

For example, when the PCS is performed, the vehicle control device 10 uses the target information acquired from the radar device 1 and controls the brake 14 to decelerate the host vehicle when it is detected that there is a preceding vehicle or a stationary object having a risk of collision in a traveling direction of the host vehicle. Further, for example, a warning device (not show) is used to warn an occupant of the host vehicle, or a seat belt in the vehicle is pulled to fix the occupant to the seat.

When the A/D converting unit 62 cannot AD sample the beat signal at the timing when the frequency of each chirp decreases, the adjusting unit 73 adjusts the modulation waveform of the transmitted wave such that the beat signal can be AD sampled at the timing when the frequency of each chirp decreases.

When a target as an object is present at a known position, the adjusting unit 73 adjusts the modulation waveform of the transmitted wave transmitted from the transmitting unit 2 such that the target is detected at the known position by the detection unit 72 and the target is not detected at positions other than the known position.

During the initial processing executed at the time of activation of the radar device 1 before shipment and after shipment, and during the failure diagnosis operation of the radar device 1, the adjusting unit 73 adjusts the modulation waveform of the transmitted wave based on the distance to the target input from the distance relative velocity calculating unit 84 and the derived result of the relative velocity with respect to the target.

Here, referring to FIGS. 3 to 8, a procedure of adjusting the modulation waveform of the transmitted wave performed by the adjusting unit 73 will be described. FIGS. 3 to 6 are operation illustrative diagrams of the radar device 1 when the adjusting unit 73 according to the embodiment adjusts the modulation waveform of the transmitted wave. FIGS. 4, 5, 7 and 8 are illustrative diagram showing a processing result of the FFT processing when the adjusting unit 73 according to the embodiment adjusts the modulation waveform of the transmitted wave.

Figure 3:
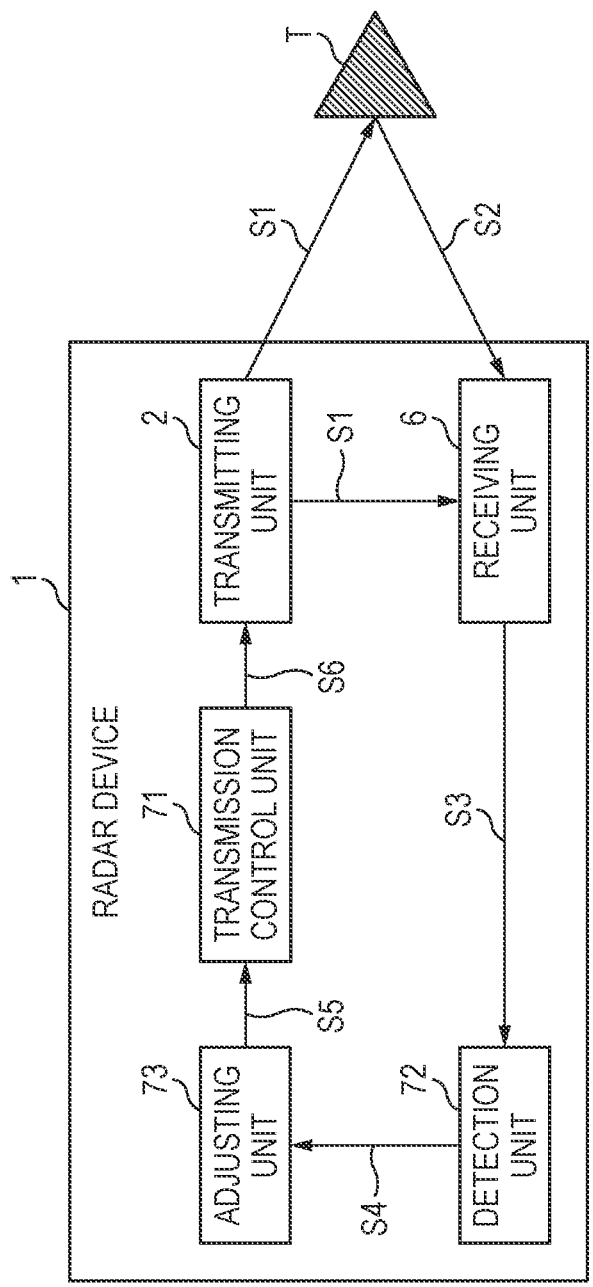
FIG. 3 is an operation illustrative diagram of the radar device when an adjusting unit according to the embodiment adjusts a modulation waveform of a transmitted wave.

As shown in FIG. 3, when the modulation waveform of the transmitted wave is adjusted before shipment, the radar device 1 transmits a transmitted wave S1 from the transmitting unit 2 toward a target T which is an object provided at the known position. At this time, the radar device 1 inputs the same transmitted wave S1 as the transmitted wave S1 transmitted toward the target T to the mixer 61 of the receiving unit 6 (see FIG. 2).

Then, the radar device 1 receives a reflected wave S2 of the transmitted wave S1 reflected by the target T by the receiving unit 6. The receiving unit 6 mixes the reflected wave S2 and the transmitted wave S1 input from the transmitting unit 2, generates a beat signal S3 by taking an absolute value of a difference between the transmitted wave S1 and the reflected wave S2, and outputs the generated beat signal S3 to the detection unit 72.

The detection unit 72 derives a distance to the target T based on the beat signal S3 input from the receiving unit 6. At this time, as described above, the detection unit 72 performs the FFT processing on the beat signal S3 and outputs a processing result S4 of the FFT processing to the adjusting unit 73.

Figure 4:
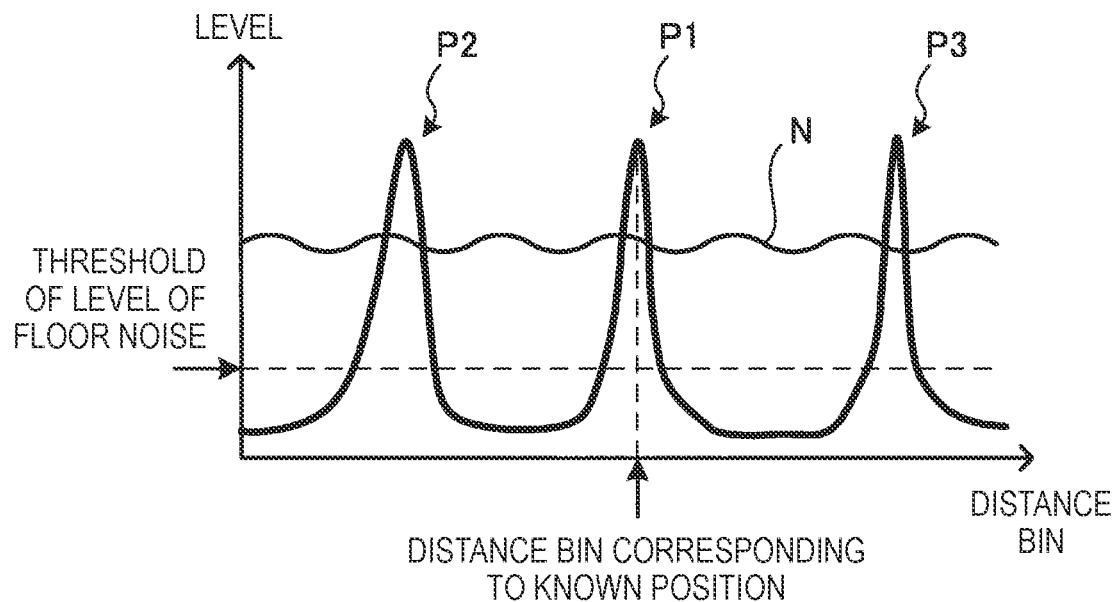
FIG. 4 is an illustrative diagram showing a processing result of FFT processing when the adjusting unit according to the embodiment adjusts the modulation waveform of the transmitted wave.

At this time, as shown in FIG. 4, when the A/D converting unit 62 cannot AD sample the beat signal at the timing when the frequency of each chirp decreases, in the processing result S4 of the FFT processing, even if there is only one target T, a plurality of peaks P1, P2, P3 may appear.

Here, the peak P1 is a peak appearing in the distance BIN corresponding to the known position. On the other hand, the peaks P2 and P3 are peaks appearing at the distance BINs corresponding to positions other than the known position. In such a case, although only one target is actually present, the radar device 1 detects three targets and the detection accuracy of the target T as the object decreases.

When the A/D converting unit 62 cannot AD sample the beat signal at the timing when the frequency of each chirp decreases, floor noise N exceeding a threshold of a level of floor noise may appear in the processing result S4 of the FFT processing. The detection accuracy of the target T also decreases by the floor noise N having a level exceeding the threshold value in the radar device 1.

Therefore, when the peaks P2 and P3 appear at the distance BINs corresponding to positions other than the known position shown in FIG. 4, or when the processing result S4 of the FFT processing in which the floor noise N having a level exceeding the threshold appears is input, the adjusting unit 73 outputs an adjustment instruction S5 of the modulation waveform to the transmission control unit 71. When the adjustment instruction S5 is input from the adjustment unit 73, the transmission control unit 71 outputs a control signal S6 for changing the modulation waveform of the transmitted wave S1 to the transmitting unit 2.

The transmitting unit 2 changes the modulation waveform of the transmitted wave S1 according to the control signal S6 input from the transmission control unit 71, transmits the transmitted wave S1 to the target T, and also inputs the transmitted wave S1 to the receiving unit 6. At this time, the adjusting unit 73 adjusts the modulation waveform of the transmitted wave S1 by changing at least one of the phase and the frequency of the continuous chirps which are the transmitted wave S1.

Figure 5:
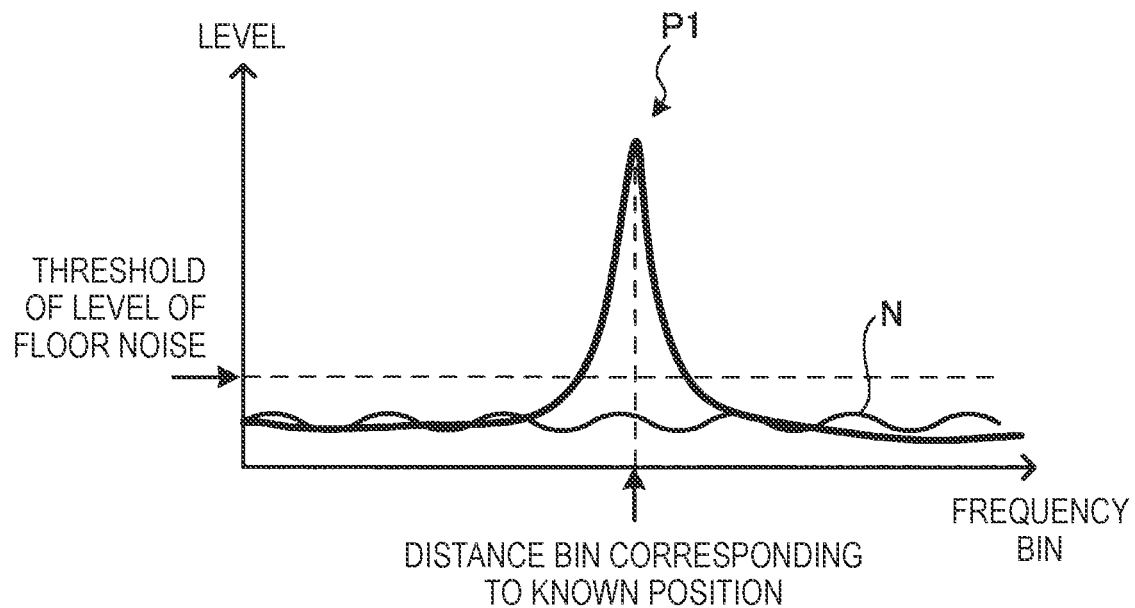
FIG. 5 is an illustrative diagram showing a processing result of the FFT processing when the adjusting unit according to the embodiment adjusts the modulation waveform of the transmitted wave.

The radar device 1 repeats this series of operations, and as shown in FIG. 5, when the peak P1 appears only at the distance BIN corresponding to the known position, and the processing result S4 of the FFT processing in which the level of the floor noise N is equal to or less than the threshold is input to the adjustment unit 73, the adjustment of the modulation waveform is ended.

That is, when the target T as the object is present at the known position, the radar device 1 repeats adjusting the modulation waveform of the transmitted wave S1 until the target T is detected at the known position by the detection unit 72 and the target T is not detected at positions other than the known position.

Accordingly, since the radar device 1 can AD sample the beat signal by the A/D converting unit 62 at the timing when the frequency of each chirp decreases, it is possible to prevent a decrease in the detection accuracy of the target T before shipment.

Figure 6:
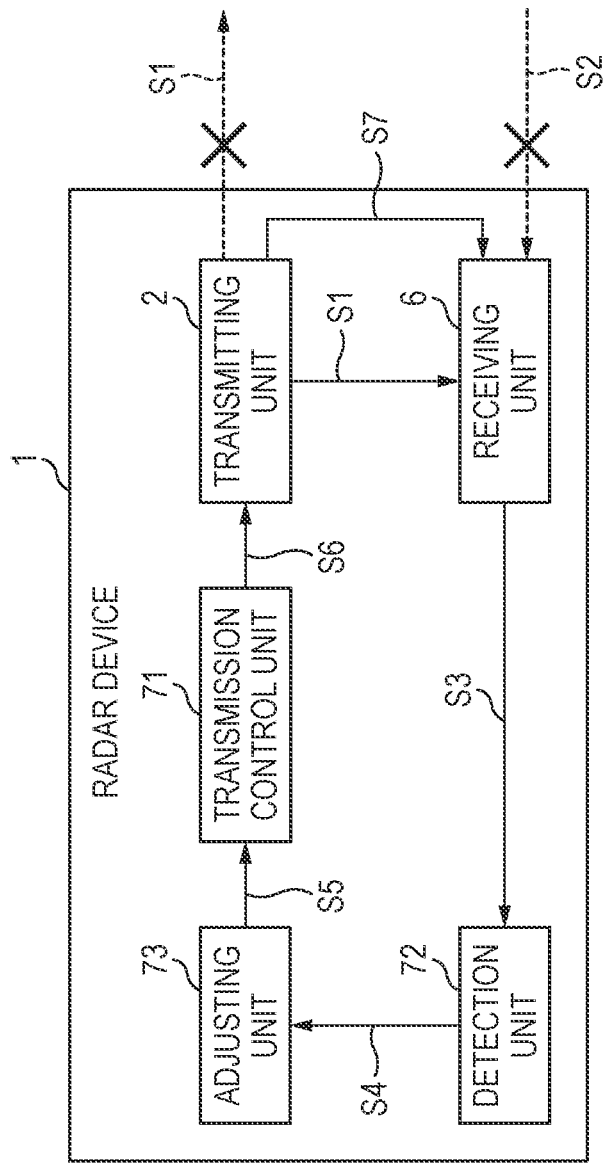
FIG. 6 is an operation illustrative diagram of the radar device when the adjusting unit according to the embodiment adjusts the modulation waveform of the transmitted wave.

Further, as shown in FIG. 6, when the radar device 1 adjusts the modulation waveform of the transmitted wave during the initial processing executed at the time of activation after the shipment or during the fault diagnosis operation of the radar device 1, the target T (see FIG. 3) as an object is not provided at the known position. Therefore, the radar device 1 does not transmit the transmitted wave S1 from the transmitting unit 2 to the target, and the receiving unit 6 does not receive the reflected wave S2 from the target as a matter of course.

Instead, the radar device 1 generates a reflected wave S7 which is supposed to arrive at the receiving unit 6 by the transmitting unit 2 if the target is present at the known position, and directly inputs the generated reflected wave S7 from the transmitting unit 2 to the receiving unit 6 via the wiring to adjust the modulation waveform of the transmitted wave S1.

Specifically, the radar device 1 first generate the reflected wave S7 which is supposed to arrive at the receiving unit 6 by the reflected wave generating unit 23 (see FIG. 2) of the transmitting unit 2 during the initial processing executed at the time of activation after shipment or during the failure diagnosis operation of the radar device 1.

As shown in FIG. 2, the reflected wave generation unit 23 shifts (delays) the phase of the transmitted wave S1 in a time period from the transmission of the transmitted wave S1 from the oscillator 22 to the arrival at the receiving unit 6 after being reflected by the target present at the known position to generate the reflected wave S7.

Then, the radar device 1 inputs the reflected wave S7 from the reflected wave generating unit 23 to, for example, the mixer 61 of the receiving unit 6-1 (see FIG. 2). At this time, the radar device 1 inputs the same transmitted wave S1 as the transmitted wave S1 transmitted toward the target when the target is detected to, for example, the mixer 61 of the receiving unit 6-1.

The radar device 1 may be configured to input the transmitted wave S1 and the reflected wave S7 from the reflected wave generating unit 23 to the mixers 61 of two or more of the receiving units 6 in the receiving units 6-1 to 6-n, respectively.

The receiving unit 6 mixes the reflected wave S7 and the transmitted wave S1 input from the transmitting unit 2, generates the beat signal S3 by taking an absolute value of a difference between the transmitted wave S1 and the reflected wave S7, and outputs the generated beat signal S3 to the detection unit 72.

The detection unit 72 derives the distance to the target T based on the beat signal S3 input from the receiving unit 6. At this time, as described above, the detection unit 72 performs the FFT processing on the beat signal S3 and outputs the processing result S4 of the FFT processing to the adjusting unit 73.

The adjusting unit 73 outputs the adjustment command S5 of the modulation waveform to the transmission control unit 71 when the peaks P2 and P3 appear at the distance BINs corresponding to positions other than the known position or when the floor noise N of a level exceeding the threshold appears, similarly to the procedure described with reference to FIGS. 3 and 4. When the adjustment instruction S5 is input from the adjustment unit 73, the transmission control unit 71 outputs the control signal S6 for changing the modulation waveform of the transmitted wave S1 to the transmitting unit 2.

The transmitting unit 2 changes the modulation waveform of the transmitted wave S1 according to the control signal S6 input from the transmission control unit 71 and inputs the modulation waveform to the receiving unit 6. At this time, the adjusting unit 73 adjusts the modulation waveform of the transmitted wave S1 by changing at least one of the phase and the frequency of the continuous chirps which are the transmitted wave S1.

Further, the transmitting unit 2 shifts (delays) the phase of the transmitted wave S1 in a time period from the transmission of the transmitted wave S1 after the change of the modulation waveform to the arrival at the receiving unit 6 after being reflected by the target present at the known position to generate the reflected wave S7 and directly inputs the reflected wave S7 to the receiving unit 6.

The radar device 1 repeats this series of operations, and as shown in FIG. 5, when the peak P1 appears only at the distance BIN corresponding to the known position, and the processing result S4 of the FFT processing in which the level of the floor noise N is equal to or less than the threshold is input to the adjustment unit 73, the adjustment of the modulation waveform is ended.

That is, the radar device 1 repeats adjusting the modulation waveform of the transmitted wave S1 until the target T is detected at the known position by the detection unit 72 and the target T is no longer detected at positions other than the known position.

Accordingly, since the radar device 1 can AD sample the beat signal by the A/D converting unit 62 at the timing when the frequency of each chirp decreases, it is also possible to prevent a decrease in the detection accuracy of the target after the shipment.

As described above, the radar device 1 can adjust the modulation waveform of the transmitted wave S1 based on the reflected wave S7 generated on the assumption that the target is present at the known position and the transmitted wave S1. Therefore, the radar device 1 can prevent a decrease in the detection accuracy of the target even when the target is not provided at the known position.

Incidentally, a case where the radar device 1 adjusts the modulation waveform of the transmitted wave S1 on the assumption that the relative velocity to the radar device 1 is zero has been described above. However, as described above, since the radar device 1 can adjust the modulation waveform so as to prevent a decrease in the detection accuracy of the target even when the target is not actually provided, it is also possible to adjust the modulation waveform on the assumption that the target is of a known relative velocity which is not zero.

Specifically, in the processing result S4 of the second FFT processing, a peak appears at the velocity BIN corresponding to the relative velocity of the target detected by the radar device 1. Therefore, the radar device 1 adjusts the modulation waveform based on the result of performing the second FFT processing on the beat signal when the modulation waveform is adjusted so as to prevent a decrease in the detection accuracy of the target on the assumption that the target is of the known relative velocity which is not zero.

Figure 7:
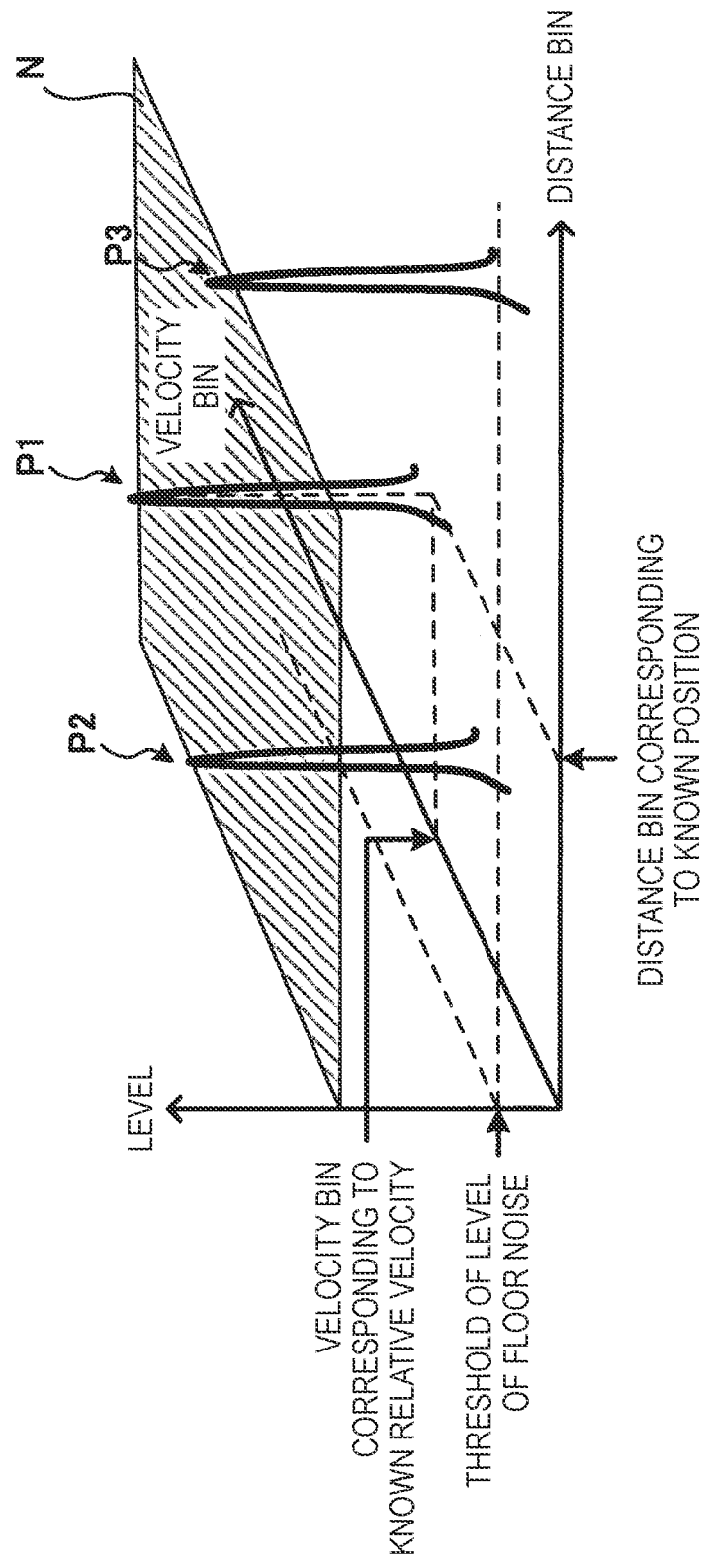
FIG. 7 is an illustrative diagram showing a processing result of the FFT processing when the adjusting unit according to the embodiment adjusts the modulation waveform of the transmitted wave.

As shown in FIG. 7, when the A/D converting unit 62 cannot AD sample the beat signal at the timing when the frequency of each chirp decreases, in the processing result S4 of the second FFT processing, even if there is only one target T, the plurality of peaks P1, P2, P3 may appear.

Here, the peak P1 is a velocity BIN corresponding to the known relative velocity and is a peak appearing at a point which is a distance BIN corresponding to the known position. Meanwhile, the peaks P2 and P3 are velocity BINs corresponding to a relative velocity which is not the known relative velocity and are peaks appearing at points which are distance BINs corresponding to positions other than the known position.

When the A/D converting unit 62 cannot AD sample the beat signal at the timing when the frequency of each chirp decreases, floor noise N exceeding the threshold of the level of the floor noise may appear in the processing result S4 of the second FFT processing. In this case, the detection accuracy of the target T decreases in the radar device 1.

Therefore, when the processing result S4 of the second FFT processing shown in FIG. 7 is input, the adjusting unit 73 outputs the adjustment instruction S5 of the modulation waveform to the transmission control unit 71, and outputs a control signal for changing the modulation waveform of the transmitted wave S1 from the transmission control unit 71 to the transmitting unit 2 to repeat the adjustment of the modulation waveform.

Figure 8:
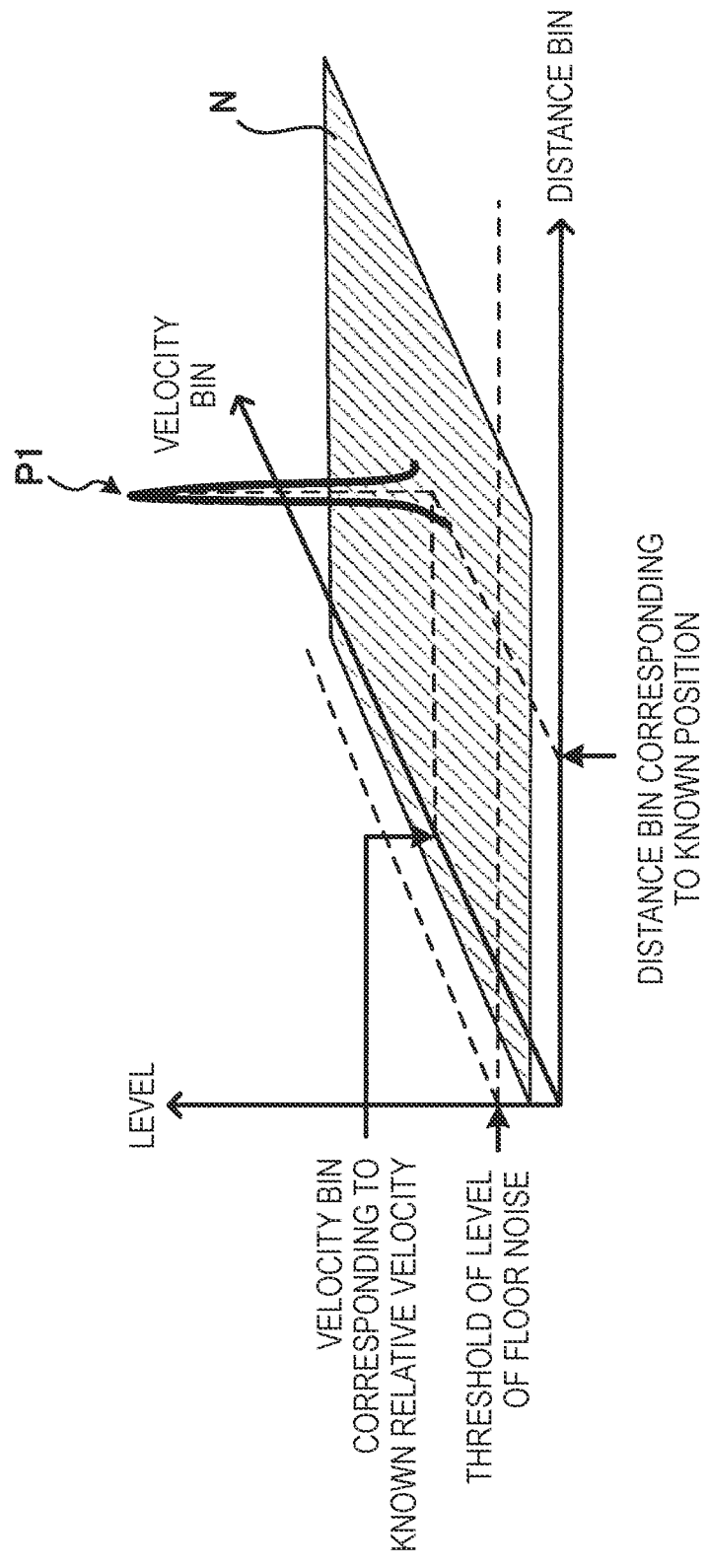
FIG. 8 is an illustrative diagram showing a processing result of the FFT processing when the adjusting unit according to the embodiment adjusts the modulation waveform of the transmitted wave.

Then, for example, as shown in FIG. 8, when the peak P1 appears only at a point which is the velocity BIN corresponding to the known relative velocity and the distance velocity BIN corresponding to the known position, and the level of the floor noise N is equal to or less than the threshold, the radar device 1 ends the adjustment of the modulation waveform.

That is, the radar device 1 repeats adjusting the modulation waveform of the transmitted wave S1 until the target moving at the known relative velocity is detected at the known position by the detection unit 72 and the target moving at a relative velocity other than the known relative velocity is not detected at positions other than the known position by the detection unit 72.

Accordingly, since the radar device 1 can AD sample the beat signal by the A/D converting unit 62 at the timing when the frequency of each chirp decreases, it is possible to prevent a decrease in the detection accuracy of the target of which the relative velocity is not 0.

Next, processing to be executed by the radar device 1 according to the embodiment will be described with reference to FIGS. 9 and 10. The radar device 1 performs processing similar to that of a general radar device during a normal target detection operation. For this reason, in order to prevent a decrease in the detection accuracy of the target in the radar device 1, the processing to be executed to adjust the modulation waveform of the transmitted wave will be described.

Figure 9:
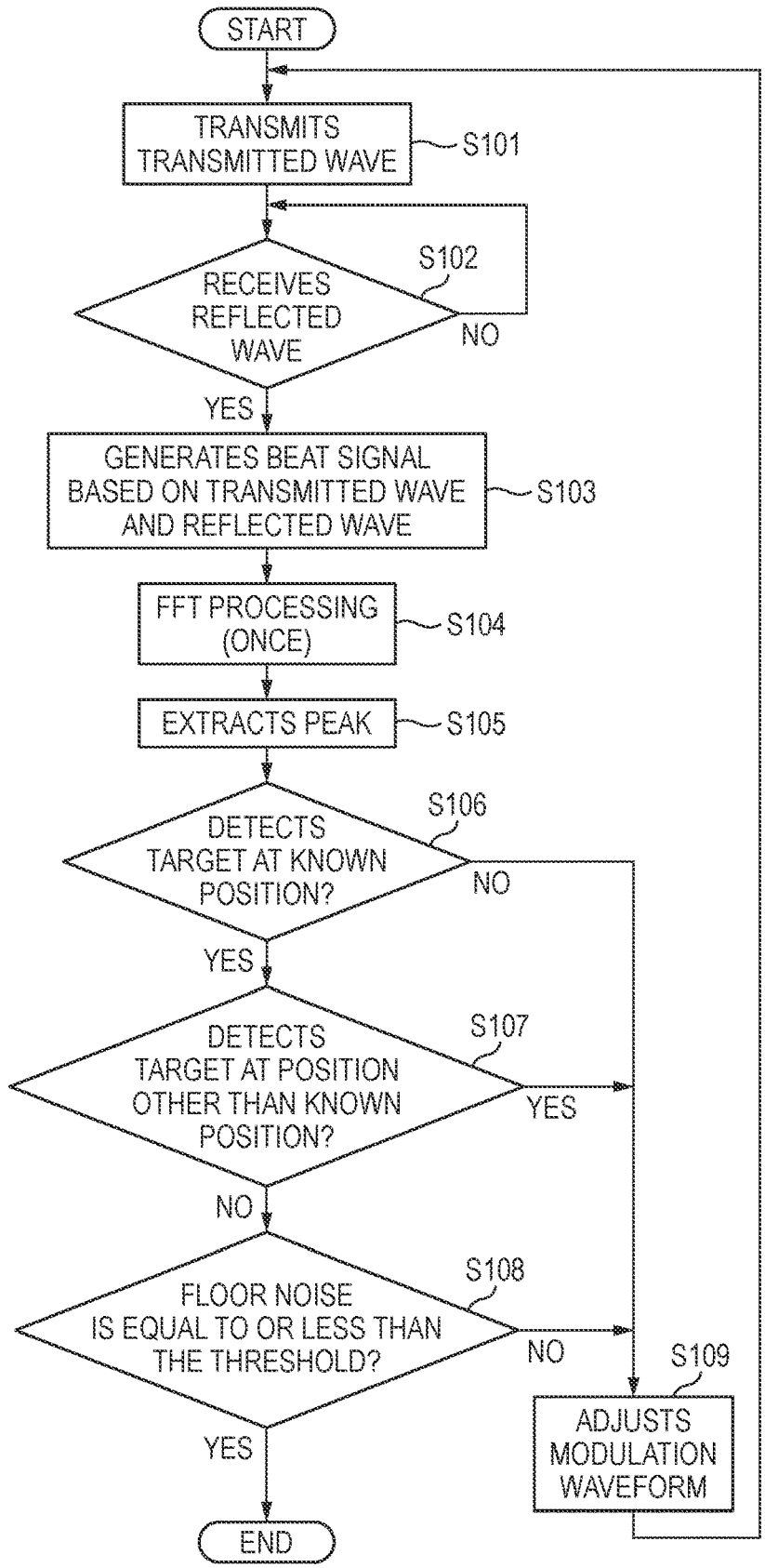
FIG. 9 is a flowchart showing processing to be executed by the radar device according to the embodiment.
Figure 10:
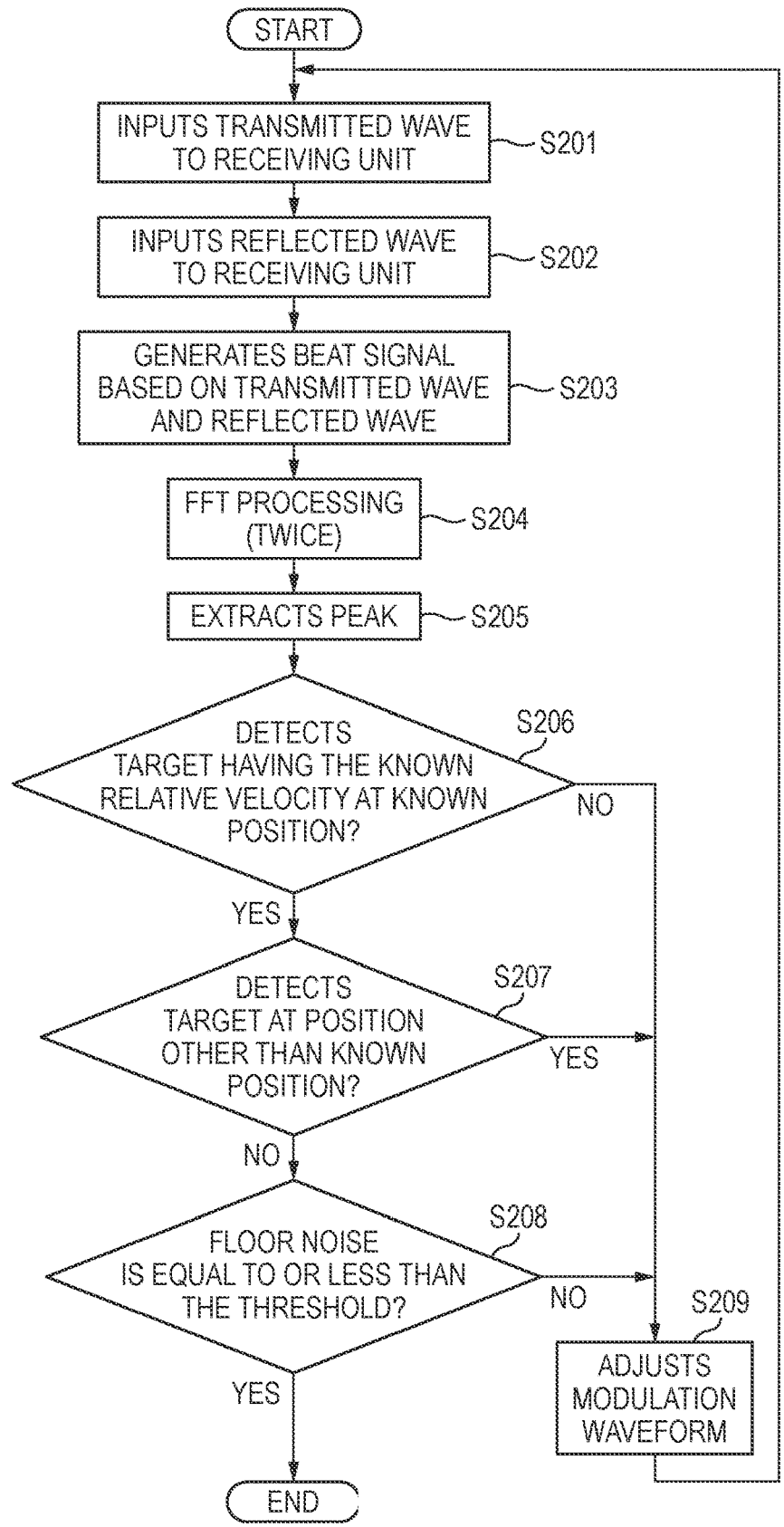
FIG. 10 is a flowchart showing the processing to be executed by the radar device according to the embodiment.

FIGS. 9 and 10 are flowcharts showing processing to be executed by the radar device 1 according to the embodiment. FIG. 9 shows an example of the processing to be executed by the radar device 1 before shipment. Further, FIG. 10 shows an example of the processing to be executed during the initial processing or during the failure diagnosis operation when the radar device 1 is activated.

As shown in FIG. 9, in the processing to be executed before shipment, the radar device 1 first transmits the transmitted wave from the transmitting unit 2 to the target provided at the known position (step S101). At this time, the radar device 1 inputs the transmitted wave from the transmitting unit 2 to the receiving unit 6.

Subsequently, the radar device 1 determines whether the reflected wave is received (step S102). When it is determined that the reflected wave is not received (step S102, No), the radar device 1 repeats the determination process of step S102 until the reflected wave is received.

When it is determined that the reflected wave is received (step S102, Yes), the radar device 1 generates the beat signal based on the transmitted wave and the reflected wave (step S103). Then, the radar device 1 performs FFT processing on the generated beat signal once (step S104).

Subsequently, the radar device 1 extracts a peak from the processing result of the FFT processing (step S105) and determines whether the target is detected at the known position based on the extracted peak (step S106). When it is determined that the target is not detected at the known position (step S106, No), the radar device 1 moves the processing to step S109.

When it is determined that the target is detected at the known position (step S106, Yes), the radar device 1 determines whether the target is detected at positions other than the known position (step S107).

When it is determined that the target is detected at positions other than the known position (step S107, Yes), the radar device 1 moves the processing to step S109. When it is determined that the target is not detected at positions other than the known position (step S107, No), the radar device 1 determines whether the level of the floor noise is equal to or less than the threshold (step S108).

When it is determined that the level of the floor noise is not equal to or less than the threshold (step S108, No), the radar device 1 adjusts the modulation waveform of the transmitted wave (step S109) and moves the processing to step S101. When it is determined that the level of the floor noise is equal to or less than the threshold (step S108, Yes), the radar device 1 ends the processing.

As shown in FIG. 10, the radar device 1 first inputs the transmitted wave from the transmitting unit 2 to the receiving unit 6 during the initial processing of activation or during the fault diagnosis operation (step S201). Further, the radar device 1 generates the reflected wave by the transmitting unit 2 and inputs the reflected wave from the transmitting unit 2 to the receiving unit 6 (step S202).

Subsequently, the radar device 1 generates the beat signal based on the transmitted wave and the reflected wave (step S203) and performs FFT processing on the generated beat signal twice (step S204). Subsequently, the radar device 1 extracts the peak from the processing result of the FFT processing (step S205)

Thereafter, the radar device 1 determines whether the target having the known relative velocity is detected at the known position based on the extracted peak (step S206). When it is determined that the target having the known relative velocity is not detected at the known position (step S206, No), the radar device 1 moves the processing to step S209.

When it is determined that the target having the known relative velocity is detected at the known position (step S206, Yes), the radar device 1 determines whether the target is detected at positions other than the known position (step S207).

When it is determined that the target is detected at positions other than the known position (step S207, Yes), the radar device 1 moves the processing to step S209. When it is determined that the target is not detected at positions other than the known position (step S207, No), the radar device 1 determines whether the level of the floor noise is equal to or less than the threshold (step S208).

When it is determined that the level of the floor noise is not equal to or less than the threshold (step S208, No), the radar device 1 adjusts the modulation waveform of the transmitted wave (step S209) and moves the processing to step S201. When it is determined that the level of the floor noise is equal to or less than the threshold (step S208, Yes), the radar device 1 ends the processing.

As described above, the radar device 1 according to the embodiment includes the transmitting unit 2, the receiving unit 6, the detection unit 72, and the adjusting unit 73. The transmitting unit 2 transmits the transmitted wave of the modulation wave whose frequency changes cyclically. The receiving unit 6 receives the reflected wave which is the transmitted wave reflected by the target. The detection unit 72 detects the target based on the reflected wave received by the receiving unit 6.

When the target as the object is present at the known position, the adjusting unit 73 adjusts the modulation waveform of the transmitted wave transmitted from the transmitting unit 2 such that the target is detected at the known position by the detection unit 72 and the target is not detected at positions other than the known position. Accordingly, the radar device 1 can prevent a decrease in the detection accuracy of the target.

A case where the radar device 1 detects the target by the FCM method has been described in the above-described embodiment, but the adjusting method of adjusting the modulation waveform of the transmitted wave based on the processing result of one FFT processing can be applied to the radar device which detects the target by the FM-CW method.

In the above-described embodiment, the case where the A/D converting unit 62 AD samples the beat signal at the timing when the frequency of each chirp decreases has been described, but the modulation waveform may be adjusted such that AD sampling can be performed at the timing when the frequency of each chirp increases.

Further, a case where one target is present or virtually present at the known position has been described in the above-described embodiment, but the present embodiment is also applicable to a case where two or more targets are present or virtually present at the known position.

In this case, the radar device 1 adjusts the modulation waveform of the transmitted wave such that the number of targets detected at the plurality of known positions by the detection unit 72 is equal to the number of targets set in advance and the level of the floor noise N detected together with the target is equal to or less than the predetermined threshold. Accordingly, the radar device 1 can further improve the detection accuracy when a plurality of targets are detected.

Additional effects and modifications can be easily derived by those skilled in the art. For this reason, the broader aspects of the present invention are not limited to the specific details and the representative embodiments shown and described above. Therefore, various modifications can be made without departing from the spirit or scope of the general inventive concept as defined by the appended claims and equivalents thereof.

What is claimed is:

1. A radar device comprising:
   a transmitter configured to transmit a transmission wave of a modulation wave whose frequency changes cyclically;
   a receiver configured to receive a reflected wave which is the transmission wave reflected by a target; and
   at least one processor programmed to:
   control the transmitter such that a diagnosis transmission wave corresponding to a reflected wave which would be reflected by a target if the target was present at a known position is generated and such that the diagnosis transmission wave is sent to the receiver, detect the target based on the diagnosis transmission wave received by the receiver, and adjust a modulation waveform of the transmission wave to be transmitted from the transmitter such that the target is detected at the known position and such that the target is not detected at positions other than the known position.

2. The radar device according to claim 1, wherein the at least one processor adjusts the modulation waveform of the transmission wave during an initial processing of activation or during a fault diagnosis operation.

3. The radar device according to claim 1, wherein the adjustment unit at least one processor adjusts the modulation waveform of the transmission wave by adjusting the frequency of the transmission wave.

4. The radar device according to claim 1, wherein the at least one processor adjusts the modulation waveform of the transmission wave by adjusting a phase of the transmission wave.

5. The radar device according to claim 1, wherein the at least one processor adjusts the modulation waveform of the transmission wave such that a number of the targets detected is equal to the number of the targets set in advance and a level of floor noise detected together with the target is equal to or less than a predetermined threshold.

6. The radar device according to claim 1, wherein the at least one processor adjusts the modulation waveform of the transmission wave to be transmitted from the transmitter such that the target provided at the known position as an object is detected at the known position and such that the target is not detected at positions other than the known position.

7. The radar device according to claim 6, wherein the at least one processor adjusts the modulation waveform of the transmission wave to be transmitted from the transmitter toward the target which is provided at the known position.

8. An adjusting method of a radar device comprising:
controlling a transmitter to transmit a transmission wave of a modulation wave whose frequency changes cyclically;

receiving a reflected wave which is the transmission wave reflected by a target;

controlling the transmitter such that a diagnosis transmission wave corresponding to a reflected wave which would be reflected by a target if the target was present at a known position is generated and such that the diagnosis transmission wave is sent to the receiver, detecting the target based on the reflected wave; and adjusting a modulation waveform of the transmission wave to be transmitted from the transmitter such that the target is detected at the known position and such that the target is not detected at positions other than the known position.

* * * * *